Figure 1:
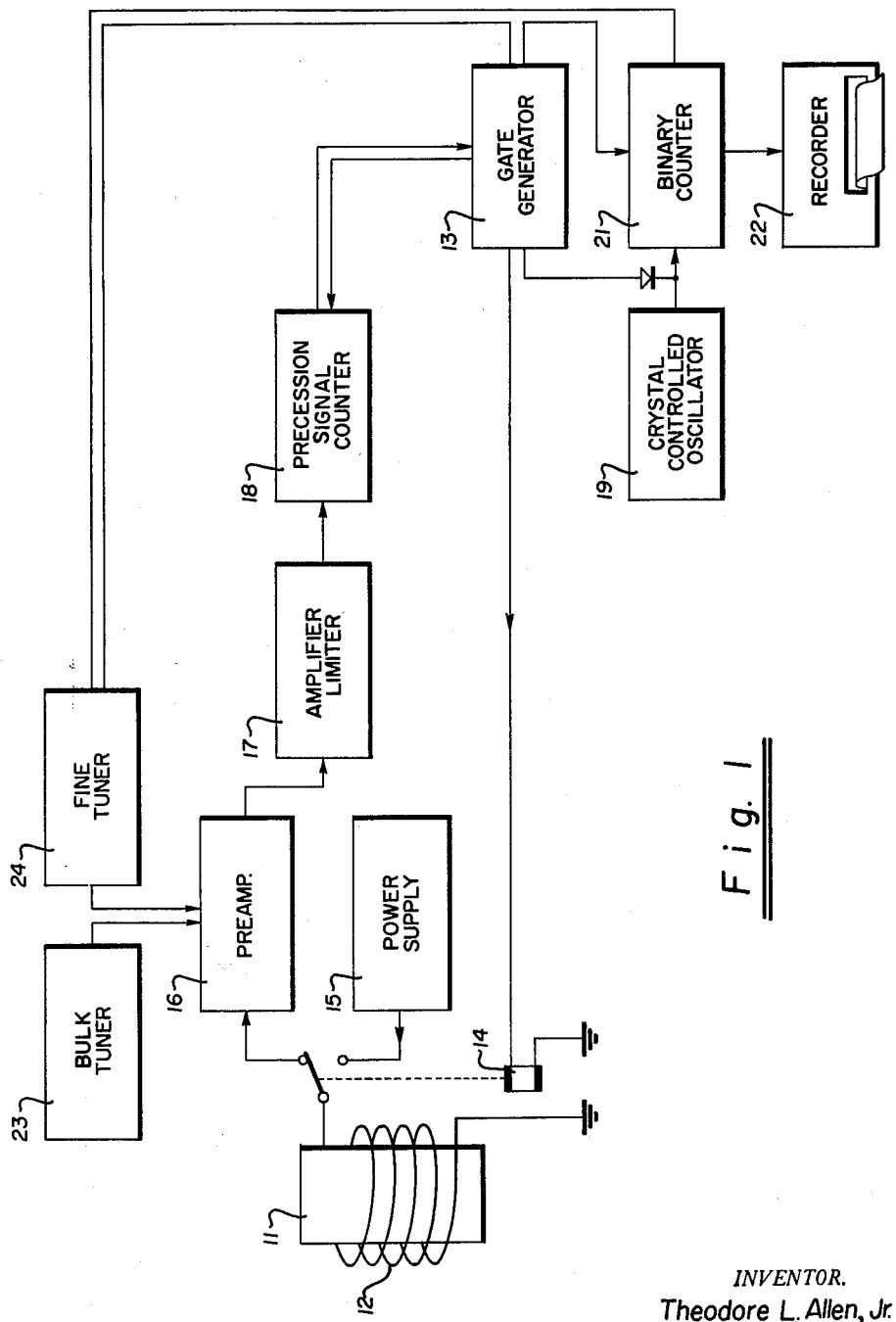

INVENTOR.
Theodore L. Allen, Jr.

INVENTOR.
Theodore L. Allen, Jr.
BY Wm J. Nolan
Attorney

United States Patent Office 3,090,002
Patented May 14, 1963

3,090,002
MAGNETOMETER APPARATUS
Theodore L. Allen, Jr., Los Altos, Calif., assignor to Varian Associates, Palo Alto, Calif., a corporation of California
Filed Jan. 10, 1958, Ser. No. 708,181
10 Claims. (Cl. 324—.5)

This invention relates in general to magnetic field measuring apparatus and more particularly to novel improvements in magnetometer apparatus which utilizes the principle of precession of atom portions such as nuclei in unknown magnetic fields for accurately determining the strength of the magnetic field.

The technique of measuring magnetic field strengths by means of the precession of atom portions possessing the properties of magnetic moment and gyroscopic moment, such as nuclei, is first explained in U.S. Patent Re. 23,769 issued to Russell H. Varian on January 12, 1954 entitled "Method and Means for Correlating Nuclear Properties of Atoms and Magnetic Fields." In a nuclear free precession magnetometer of present design the nuclei utilized are protons in a sample of water or kerosene, for example. The sensing head which includes the sample is placed in the magnetic field which one desires to measure, for example, the earth's magnetic field, and a strong polarizing magnetic field $H_0$ is applied to the protons by means of a coil surrounding the sample material to polarize the proton magnetic moments $M_0$ substantially at right angles to the earth's magnetic field. This polarizing magnetic field is applied sufficiently long to align the nuclear magnetic moments, for example, three seconds, and is suddenly turned off with the result that the nuclear magnetic moments are left substantially perpendicular or at least at some substantial angle relative to the direction of the earth's magnetic field and are free to precess about the direction of the earth's magnetic field at the Larmor frequency of the nuclei. This Larmor frequency is given by the equation $\omega = \gamma_p \times H$ where H is the earth's field strength and $\gamma_p$ is a constant referred to as the gyromagnetic ratio of the nuclei. Since the gyromagnetic ratio is a fixed constant, the frequency of the precession is directly proportional to the strength of the earth's magnetic field.

The precessing magnetic moments induce a voltage in a pick-up coil surrounding the sample which in most instances of use is the same coil that was used for polarizing. The induced alternating signal is transmitted to a suitable receiver system where the frequency of the signal is accurately measured and, in accordance with the above equation, the magnitude of the earth's magnetic field determined. Using protons, the Larmor frequency corresponding to the earth's magnetic field (.5 gauss) is about 2 kilocycles. The system is highly accurate because the precession or Larmor frequency depends only on the strength of the earth's magnetic field and the constant $\gamma_p$. The protons in water $\gamma_p$ have been measured to an absolute accuracy of about 1 in 40 thousand. Relative measurements can be even more accurate and will be limited only by the fundamental conditions of the apparatus.

Since the earth's magnetic field varies over the surface from about 73,000 gammas to 23,000 gammas it is necessary that the receiver system will accept signal frequencies over a band from about 3125 to 1000 cycles per sec. Providing a receiver with a reception band of this extent has been found to be undesirable since noise enters the system and tends to mask the small free precession signal.

The present invention provides a novel apparatus for automatically tuning the receiver system after succeeding precession frequency measurements such that the receiver follows changes in the precession frequency resulting from changes in magnetic field strength. Thus, the receiver may be fine tuned rather than broad tuned and the problem of noise pick-up greatly reduced.

It is, therefore, an object of the present invention to provide a novel apparatus for automatically and rapidly tuning the receiver system of a precessing atom magnetometer.

One feature of the present invention is the provision of a novel apparatus for both coarsely and finely tuning the amplifier system of the receiver section of a precessing atom magnetometer.

Another feature of the present invention is the provision of a novel precessing atom magnetometer in which an automatically controlled fine tuning network is included in the receiver section thereof and is automatically operated in response to the last frequency count of the magnetometer to tune the magnetometer.

Still another feature of the present invention is the provision of a novel apparatus of the immediately preceding type in which the fine tuning network comprises a plurality of switches operated from the frequency counting circuitry in the receiver for automatically switching the desired circuit elements into the fine tuning network.

Figure 2:
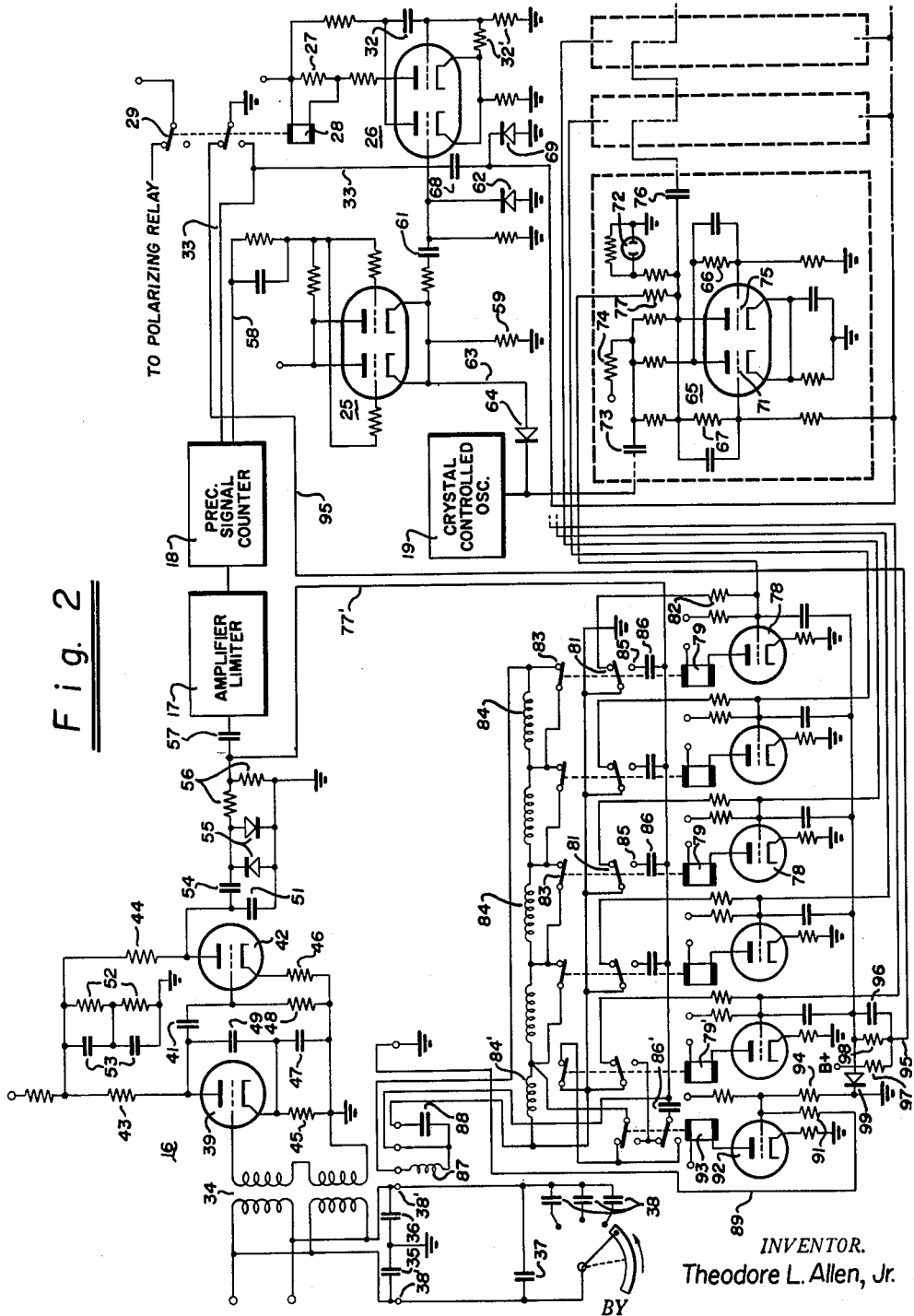

These and other features and advantages of the present invention will become more apparent upon a perusal of the following specification taken in connection with the drawings wherein, FIG. 1 is a block diagram of a typical nuclear free precession magnetometer system to which the present invention is particularly adapted, and FIG. 2 is one embodiment of the present invention disclosing preferred circuitry for both manually and automatically tuning the receiver system of the magnetometer.

Referring now to FIG. 1 there is shown in block diagram a basic nuclear free precession magnetometer system which includes a sensing head adapted to be positioned in the magnetic field to be measured which we will assume to be the earth's magnetic field. The sensing head comprises a sample material such as water sealed in a container 11 and a coil of wire 12 axially wound about the container. Typically, the coil is constructed so as to carry a D.C. current of about 6 amps. and produce a polarizing magnetic field of about 100 gauss in the sample to polarize the protons therein. A gate generator circuit 13, preferably an electrical switching system or, if desired, a mechanical cam device, automatically operates to pulse a relay 14 which, in its operated position, couples the sensing coil 12 to a D.C. power supply 15 and, in its released position, couples the sensing coil 12 to the free precession counting system. The gate generator 13 typically operates to couple the coil 12 to the power supply for approximately 3 seconds and then to the counting circuit for approximately 2 seconds. During the period of time when the coil 12 is connected to the power supply 15, a polarizing magnetic field is produced to align the magnetic moments of the protons in the sample in the direction of the polarizing magnetic field which is at a substantial angle, preferably normal, to the direction of the earth's magnetic field. On disconnect of the coil 12 from the power supply 15, the polarizing field quickly decays and leaves the aligned magnetic moments to precess in the earth's magnetic field. The precessing magnetic moments induce an alternating current in the sensing coil 12, this alternating frequency signal being transmitted to the receiver system which comprises a preamplifier 16, the output of which is coupled through a pulse-shaping amplifier limiter 17 to a precission signal counter 18 which, in most instances of use, is a binary counter chain operating to count a fixed number of cycles of the free precession signal. Ordinarily, the binary counter 18 rejects a number of the precision cycles at the beginning of each signal before starting the formal count to avoid possible miscounts due to transients before initiating the formal count. On initiation of the formal count of the first cycle by the counter 18, the gate generator circuit 13 operates to close the circuit from a standard frequency source 19 to a reference counter 21. This standard frequency source may be, for example, a 100 kilocycle crystal controlled oscillator and the reference counter a second binary counter chain for counting the cycles from the standard frequency counter. A predetermined number of cycles is counted in the precession signal counter 18, for example, 2,000 cycles, and, in response to the last cycle in this formal count, the gate generator 13 is operated to disable the circuit from the standard frequency source 19 to the reference counter 21. As the frequency of the free precession signal increases or decreases with a magnetic field strength, the time duration of the gate decreases or increases, respectively. The number of cycles from the standard frequency source 19 counted by the counter 21 during the gate period is a precise measurement of the gate time and thus a highly accurate measurement of the frequency of the free precession signal, and thus the earth's magnetic field strength can be accurately determined. At the end of the gate period, a voltage proportional to the number of crystal controlled pulses counted by counter 21 is fed to a graphic recorder 22 or the like where a record is made in field strength readings.

As noted above, the frequency of the free precession signals varies over a fairly wide bandwidth in an earth's field magnetometer due to the variation of the magnetic field strength over the earth's surface. For this reason a manual bulk tuner 23 is provided at the input of the preamplifier 16, this bulk tuner providing manually selective course tuning circuits for broadly tuning the input of the preamplifier circuit so as to limit the bandwith of the preamplifier to a preselected range. A fine tuner circuit 24 is also provided for inserting proper filter networks in the preamplifier for finely tuning the preamplifier within the preselected coarse tuning range. This fine tuner circuit is automatically controlled from the reference counter 21 so as to tune the preamplifier in accordance with the last frequency count registered in the reference counter. In this manner the preamplifier is automatically tuned as the magnetic field strength varies.

One embodiment of the present invention utilizing preferred circuitry is disclosed in FIG. 2 Certain of the known circuitry within the obvious skill of those in this field is shown in block diagram form such as the amplifier limiter while the circuitry in which the present invention is embodied is shown in detail.

The main control pulses for operating the present magnetometer are derived from the gate generator circuit 13. This gate generator includes a cathode follower amplifier 25 and a free running type of multivibrator circuit 26. The multivibrator 26 comprises a double triode tube arranged to produce a chain of square wave pulses across the load resistor 27 of the plate of the second stage, these output square wave pulses acting to operate the associated main control relay 28 in desired pulsing manner. When the main control relay 28 is in a de-energized state, a circuit is closed through break contacts 29 to operate switching relay 14 and connect the magnetometer coil 12 to polarizing current source 15. During this polarizing period the second stage of the multivibrator circuit 26 is nonconducting and the first stage draws heavy plate current. The multivibrator works in a manner such that when the first stage first drew heavy plate current (responsive to a pulse from the cathode follower circuit 25 as will be subsequently described), the condenser 32 coupling the plate of the first stage to the grid of the second stage charged up rapidly to a below-cutoff negative value. The condenser 32 discharges slowly through the two resistors 32' and the common cathode resistor to ground and the potential on the grid of the second stage rises to the cutoff value where plate current commences to flow in the second stage and the plate current in the first stage begins to decrease because of increased bias voltage developed across the common cathode resistor in accordance with standard multivibrator practice. The plate current in the second stage rises and the plate current in the first stage decreases to zero very rapidly such that almost instantaneously the heavy plate current flips to the second stage. The heavy plate current in the second stage energizes the main control relay 28 which operates to open contacts 29 and de-energize the polarizing relay 14 which releases and switches the magnetometer coil 12 from the polarizing supply source 15 to the preamplifier stage 16. Also, ground is switched to lead 33 to enable the binary counter chain 18 for counting the cycles in the free precession signal.

The output from the magnetometer coil 11 is coupled to the preamplifier circuit 16 through a coupling transformer 34, the two primary windings of which are connected in parallel. Coupled across the primary windings is a bulk tuner circuit which comprises a network of condensers which may be manually selected to produce a desired frequency band pass network coarsely tuned to the approximate frequency of the free precession signal. Condensers 35 and 36 are permanently connected across the parallel connected primary windings, the midpoint connection of the condensers being grounded. Selected condenser networks each comprising a condenser 37 and condensers 38 are connected at terminals 38' in parallel across the primary coils of the transformer 34. By suitably selecting the values of condensers 37, 38 one may provide any desired frequency bandwidth for the input of the preamplifier. For example, in one instance of use, the condensers 37, 38 are so selected to give a total frequency bandwidth of from 2500 to 3125 cycles per second, different ones of condensers 38 being switched into the network to select smaller ranges within the bandwidth. To cover the frequency range 1,000 to 3,125 cycles per second, one system utilizes approximately 16 of these bulk tuner networks with 50% overlapping ranges for the coarse tuning at the input end of the preamplifier.

The secondary of transformer 34 is coupled to the control grid of the first stage 39 of a two stage linear amplifier circuit. The plate of the first stage 39 is coupled through condenser 41 to the control grid of the second stage 42. This linear amplifier circuit includes the plate resistors 43 and 44, cathode resistors 45 and 46, cathode by-pass condenser 47 and grid leak resistor 48. Condensers 49 and 51 are provided for shunting any undesired high frequency signals to ground from the plate circuits. A decoupling circuit is provided including resistors 52 and condensers 53 for isolating the linear amplifier from the B+ supply to prevent any A.C. from flowing back into the supply. The output signal from the plate of the second stage 42 is the amplified precession signal and is coupled through coupling capacitor 54 to a diode limiter 55 consisting of two rectifiers which serves to clip only the excessive amplitude levels from the amplified alternating signal. The alternating signal is then transmitted through a voltage divider 56 and a coupling capacitor 57 to the amplifier limiter 17 which serves to produce an approximate square wave signal with steep leading and trailing edges at the precession signal frequency.

The approximate square wave output signal from the amplifier limiter is transmitted to the binary counter chain 18. The binary counter chain consists of a plurality of Eccles-Jordan flip-flop circuits connected in cascade. The first flip-flop circuit in the chain is utilized as a shaper circuit for producing square wave signals. The succeeding flip-flop circuits are connected as binary counters. In one preferred embodiment, 512 cycles of the free precession signal are counted and the chain therefore consists of 10 binary counter circuits in cascade, not including the shaper circuit. The binary circuits in the chain are similar in construction to the binary counters in the second binary chain described in more detail below. As stated above, the binary counter 18 discards the initial cycles of the free precession signal to eliminate possible transient problems before beginning the actual or formal count. When the binary counter 18 is ready to start the actual count, it applies a negative potential over lead 58 to the grid of the cathode follower stage 25 in the gate generator which results in a sharp drop in potential across the load resistor 59 of this cathode follower. The leading edge of this negative output of the cathode follower is transmitted through a differentiating circuit 61 which operates on the leading edge of the negative pulse to create a negative pulse. A diode 62 at the input of the free running multivibrator 26 shorts out the negative pulse from the differentiating circuit. After the binary counter chain 18 has counted the desired number of cycles, the negative potential is removed from lead 58 and the potential on resistor 59 goes positive. Differentiating circuit 61 operates on the trailing edge of the negative pulse to produce a positive pulse which drives the grid of the first stage of the multivibrator circuit above cutoff so that the first stage will conduct and the second stage will be nonconducting and polarizing will begin again.

The negative potential on the output of the cathode follower is also transmitted over lead 63 to the crystal controlled oscillator circuit 19 and serves as a fast gate signal. This negative potential serves to bias the diode 64 located at the output of the oscillator which until being biased had shorted out the oscillator to the binary counting circuit 21. The signal from this oscillator is transmitted to the binary counter chain 21 which consists of a plurality of Eccles-Jordan flip-flop circuits connected in cascade. Only one of the Eccles-Jordan circuits is shown and it operates as follows. A double triode tube 65 serves as a two-stage direct-coupled amplifier in which the output (plate) of each of the two stages is direct coupled through resistors 66 and 67 to the input of the other stage. This circuit has two stable conditions similar to the multivibrator circuit the plate of the first stage carrying heavy current and that of the second stage carrying no current and vice versa. These conditions are stable since, unlike the multivibrator, there is no capacitor being discharged to ultimately cause a rapid transition from one state to the other.

This binary counter chain is set for counting in the following manner. When relay 28 is released and ground thus disconnected from lead 33, condenser 68 is charged due to positive potential in the first binary system 18, the lower plate of the condenser 68 being grounded through diode 69. When relay 28 operates, it connects ground to lead 33 and the lower plate of the condenser goes sharply negative and then discharges rapidly. This sharp negative pulse drives the control grids 71 of the first stages of each tube 65 negative, the first stages becoming nonconductive and the second stages conductive. Each of the binary counters has a neon light 72 connected between ground and the plate of the second stage. With the second stage conducting, the potential at the plate is too low to light the neon lamp.

The binaries are now in condition to count the chain of pulses from the oscillator 19 when the diode 64 becomes biased as described above. The coupling condenser 73 and resistor 74 form a differentiating circuit which operates on the trailing edge of the positive half of the first incoming square wave to produce a sharp negative pulse which is applied to the grid 75 of the conducting second stage to drive the grid more negative than cutoff. This second stage ceases to conduct and the potential on the grid of the first or nonconducting stage increases above the cutoff value and the stage one conducts. Thus the heavy current is switched from the second stage to the first stage almost instantaneously. This first binary counter remains in this stable state until the next negative pulse is received from the differentiating circuit to drive the grid of the first or conducting stage more negative than cutoff and thus switch the heavy current from the first stage to the second stage. It is noted that the leading edge of the positive half cycle of the square wave transmitted to the differentiating circuit results in a positive pulse on the input to the first binary counter but this positive pulse serves no purpose in causing a switching in operation of the first binary counter.

The output of this binary counter stage is thus a square wave signal which is exactly one-half the frequency of the incoming square wave signal or, in other words, for every two pulses received by this binary counter it transmits one pulse to the succeeding binary counter. This binary counter action is familiar to those skilled in the art and no further detailed description thereof is deemed necessary to the understanding of this invention.

The slow binary counter stage counts the free precession signals until a predetermined number of cycles have occurred, for example 512, at which time the binary counter circuit 18 operates to apply a positive potential on lead 58 to the grid of the cathode follower 25 in the gate generator circuit. The cathode follower produces a positive potential on the lead 63 which results in a termination of the high frequency cycles to the fast counter. The count registered in the binary counter chain 21 remains stored therein until the negative reset pulse is received from the condenser 68 at the start of the next free precession count period.

The frequency count stored in the second binary counter chain 21 is indicated by the condition of the neon lights 72 which are lighted when the second stage is nonconducting. The plate of each of the second stages in the last five counters in the chain where the variation in count ordinarily takes place is also coupled through a resistor 77 to an associated switching circuit in the automatic tuner which is coupled to the output of the preamplifier at lead 77'. Each switching circuit includes a triode 78 and a relay 79 in the plate circuit of the triode. The tubes 78 and associated relays 79 will operate in accordance with the frequency count in the associated binary stages, a positive voltage on the grid of the tube 78, which occurs when the asociated binary stage is nonconducting, resulting in a plate current to operate the associated relay 79. Operation of relay 79 opens contacts 81 and thus removes ground from a high resistance 82 so that the operated tubes 78 will remain conducting during subsequent switching in the binary counter chain 21 until released by a release signal as described below. The operated relays 78 remove short circuits at contacts 83 from the associated induction coils 84 and also at contacts 85 place condensers 86 in the tuning circuit at the output of the preamplifier. Each of the bulk tuner circuits also include a different valued inductor 87 and condenser 88 which connect between ground and the input to the amplifier limiter 17. These components together with resistors 56 which serve as a coarse tuning filter section of the automatic tuner to coarsely tune the output of the preamplifier 16. The inductors 84 adapted for connection in series with the bulk inductor 87 and condensers 86 adapted for connection in parallel with bulk condenser 88 serve to further finely tune this output filter circuit. The right hand inductor 84 and condenser 86 form the finest tuning elements in the switching chain while the left hand inductor 84' and condenser 86' form the coarsest tuning elements. Since, as noted above, the bulk tuners are adapted so that the tuning ranges have a fifty percent tuning range overlap, it is desirable to be able to reverse the switching action of relay 79' associated with the coarsest tuning inductor 84' and condenser 86'. Thus with alternate or odd bulk tuners, ground is connected at lead 89 to low resistance 91 which results in a below-cutoff potential on the grid of tube 92. With relay 93 in its unoperated position, the inductor 84' and condenser 86' are connected so that operation of relay 79' couples inductor 84' and condenser 86' into the tuning circuit in the same manner as the other relays 79 in the chain. With the other alternate or even bulk tuners, ground is not connected to lead 89 and the low resistance 91 is not in the grid circuit. Large resistance 94 results in an above-cutoff potential on the grid and tube 92 conducts. Relay 93 operates to switch the inductor 84' and condenser 86' into the tuning circuit such that relay 79', when operated, removes inductor 84' and condenser 86' from the circuit rather than adding them to the circuit.

The relays 79 remain operated during the next count by the binary counter circuit 21 and, when the gate generator operates to start the next period of polarization, it also applies ground to lead 95. Condenser 96 had been charged through a series circuit comprising resistor 97 connected to battery condenser 96 and resistor 98 in parallel, and diode 99 to ground. The lower plate of condenser 96 is positive when charged through the above circuit. Ground applied to lead 95 results in the upper plate of condenser 96 immediately going negative with respect to ground and this negative pulse drives the grids of the tubes 78 below cutoff and all of the operated relays release. The negative potential on the upper plate of condenser 96 remains only momentarily since condenser 96 discharges through resistor 98 and, when this negative pulse decays, the tubes 78 will again conduct and relays 79 will be operated in accordance with the count presently registered in the associated binary counter chain as described above. The diode 99 prevents a positive potential being applied to the grids of tubes 78 when the gate generator operates to remove ground from lead 95. Thus, the fine tuner 24 is an open loop control which automatically tunes the preamplifier 16 to a particular frequency dependent on the last count obtained in the binary counter 21 and then ceases tuning operations during the next counting cycle. By open loop control is meant one in which an input signal or command is applied, amplified (usually), and a power output is obtained. This is in contradistinction to a closed loop control system in which the actual output is measured and a signal corresponding to the measurement is fed back to the input station, where it is compared with the input, this comparison effective to produce a signal proportional to the difference between input and output. The error thus determined is used to drive the system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an atomic free precession magnetometer of the class wherein atom portions in a sample of matter are first polarized by a strong magnetic field and then precess in the magnetic field to be measured and induce a field dependent signal in a suitable receiver system, the combination with said magnetometer of a tuning circuit in said receiver system, and open loop control means for automatically operating said tuning circuit in response to the field dependent signal to automatically tune said magnetometer receiver system to said precession frequency.

2. The combination as claimed in claim 1 wherein said magnetometer is a nuclear free precession magnetometer, said atom portions being nuclei.

3. The combination as claimed in claim 1 wherein said last means comprises a plurality of switching circuits, said switching circuits being controlled in accordance with said field dependent signal and switching desired tuning elements into the tuning circuit in accordance with the frequency of precession.

4. In an atomic free precession magnetometer of the class wherein atom portions in a sample of matter are first polarized by a strong magnetic field and then precess in the magnetic field to be measured and produce a field dependent frequency signal in a suitable receiver system which includes means for accurately determining the frequency of the free precession signal, the combination with said magnetometer of a variable tuning circuit in said receiver system, said tuning circuit having both capacitance and inductance, switching means coupled to said tuning circuit for selectively tuning the circuit by varying both said capacitance and inductance so as to be responsive to a particular frequency band, and means controlled by said precession frequency determining means in said receiver system for selectively operating said switching means for tuning said tuning circuit to the measured precession frequency.

5. The combination as claimed in claim 4 including a manually operated coarse tuning circuit in said receiver system for first coarsely tuning the receiver to the precession frequency.

6. The combination as claimed in claim 4 wherein said magnetometer is a nuclear free precession magnetometer, said atom portions being nuclei.

7. An atomic free precession magnetometer in which atom portions in a sample of matter are first polarized by a strong magnetic field and then precess in the magnetic field to be measured and produce a field dependent frequency signal comprising means for producing said polarizing magnetic field, means for detecting said free precession signal in said magnetic field to be measured, said last means including an amplifier for amplifying said free precession signal, a frequency counting circuit coupled to said amplifier for counting the frequencies of said free precession signal, said free precession signal counter counting a predetermined number of cycles in said signal, a source of standard radio frequency, a second frequency counting circuit adapted to be coupled to said standard frequency counter, said second counter circuit counting the frequency from said standard frequency source during the period said first counter circuit is counting a predetermined number of cycles in said free precession signal, a tuning circuit coupled to said amplifier switching means in said tuning circuit for selectively tuning said circuit, and means coupling said second counter circuit to said switching means for actuating said switching means and thus tuning said amplifier in accordance with the frequency count registered in said second counter circuit.

8. Apparatus as claimed in claim 7 wherein said switching circuits comprise a plurality of relays controlled from said second counting circuit, said relays in one position coupling tuning condensers and inductors into said amplifier circuit and in another position removing said condensers and inductors from said tuning circuit.

9. In an atomic free precession magnetometer of the class wherein atom portions in a sample of matter are first polarized by a strong magnetic field and then precess in the magnetic field to be measured and produce a field dependent frequency signal in a suitable receiver system which includes means for accurately determining the frequency of the free precession signal, the combination with said magnetometer of a tuning circuit in said receiver system, said tuning circuit comprising a chain of inductors and condensers adapted to be coupled into and decoupled from said receiver system for selectively tuning the system, a plurality of relays for controlling the coupling and decoupling of said inductors and condensers in said tuning circuit, and means controlled by said precession frequency determining means in said receiver system for selectively operating said relays to thereby selectively tune said receiver system to the measured precession frequency.

10. The combination as claimed in claim 9 including means operated at the beginning of each free precession period for momentarily releasing all of said switching relays, said relays then operating in response to said precession frequency determining means.

References Cited in the file of this patent

UNITED STATES PATENTS

| Re. 23,769 | Varian | Jan. 12, 1954 |
| 2,462,630 | Gille | Feb. 22, 1949 |
| 2,589,494 | Hershberger | Mar. 18, 1952 |
| 2,743,419 | Chatterton et al. | Apr. 24, 1956 |
| 2,772,391 | Mackey | Nov. 27, 1956 |
| 2,845,595 | Leete | July 29, 1958 |
| 2,863,116 | Olsson et al. | Dec. 2, 1958 |

OTHER REFERENCES

Hunter et al.: The Oil and Gas Journal, vol. 54, No. 66, Aug. 6, 1956, pp. 144 and 145.

Gimlettt: Engineering and Mining Journal, vol. 158, No. 5, May 1957, pp. 88 to 90.